July 10, 1962  H. ALBINGER, JR., ETAL  3,043,948
COMBINATION LENS AND LAMP HOLDER
Filed April 8, 1960  2 Sheets-Sheet 1

Inventors:
Harry Albinger Jr.,
Chester B. Marble
by Leonard J. Platt
Their Attorney July 10, 1962 H. ALBINGER, JR., ETAL 3,043,948
COMBINATION LENS AND LAMP HOLDER
Filed April 8, 1960 2 Sheets-Sheet 2

Inventors:
Harry Albinger Jr.,
Chester B. Marble
by Leonard J. Platt
Their Attorney

United States Patent Office 3,043,948
Patented July 10, 1962

3,043,948
COMBINATION LENS AND LAMP HOLDER
Harry Albinger, Jr., and Chester B. Marble, Ashland, Mass., assignors to General Electric Company, a corporation of New York
Filed Apr. 8, 1960, Ser. No. 20,953
3 Claims. (Cl. 240—1)

This invention relates generally to the illumination of dials or panels, and more particularly, to a combined lens and lamp holder structure.

Since the advent of plastics, there has been a practice of edge lighting such indicating devices as plastic dials with the source of illumination located at the edge of the dial and concealed from view. The light from this source is conducted by a series of internal reflections through the plastic dial or lens plate and emerges as visible light when an irregularity such as engraved mark is encountered in the surface of the plastic plate. It has been the usual practice to provide a holder or socket for the source of illumination which is separate from the dial to be illuminated and therefore requires expensive and complicated support arrangements.

It is, therefore, an object of this invention to provide a combined lens and lamp holder structure which is relatively inexpensive to manufacture.

It is a further object of this invention to provide such a structure which affords uniform illumination of a plastic dial or panel.

It is an additional object of this invention to provide a combined lens and lamp holder structure which is molded or otherwise assembled in one integral plastic unit and into which the light source may be easily inserted.

One important feature of this invention is the provision of an integral lens and lamp holder assembly of light-transmitting plastic which provides both a simple and inexpensive means for holding the lamp or other light source in position and also a novel means for conducting the light from the plane of the light source to the plane of the lens plate for uniform distribution over the area of this lens plate. The lamp holding means is formed from a light-conducting material which is of a C-shape so that the illuminating lamp may easily be inserted in place and held securely in the desired position. The lamp holding means also serves to conduct light rays from the lamp to the edge of the lens where it is distributed throughout the lens plate.

The subject matter which we regard as our invention is particularly pointed out and distinctly claimed in the concluding portion of this specification. Our invention, however, both as to organization and method of operation together with further objects and advantages thereof may best be understood by reference to the following description taken in connection with the accompanying drawings, in which:

Where the terms "lens" or "lens plate" are used herein they are intended to include indicator dials, signs, and similar devices formed of plastic in which light rays or illumination may be conducted to indicia on or in front of the plate from a source of illumination located at the edge of the plate.

Figure 1:
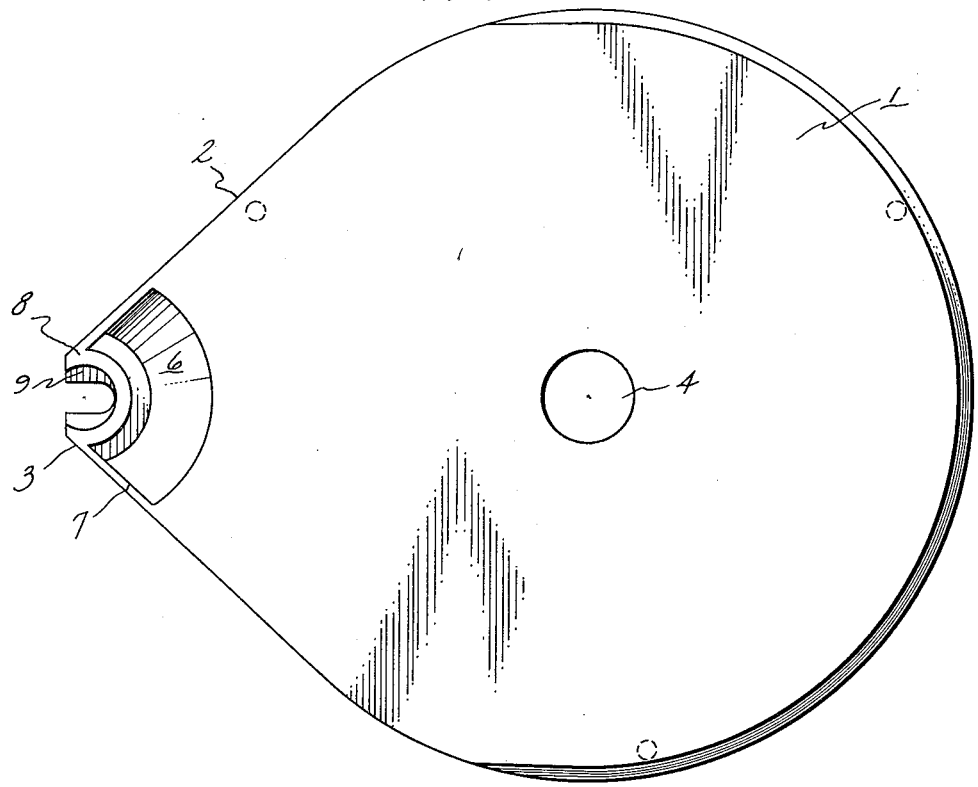
FIGURE 1 is a detailed view of the combined lens and lamp holder assembly.
Figure 2:
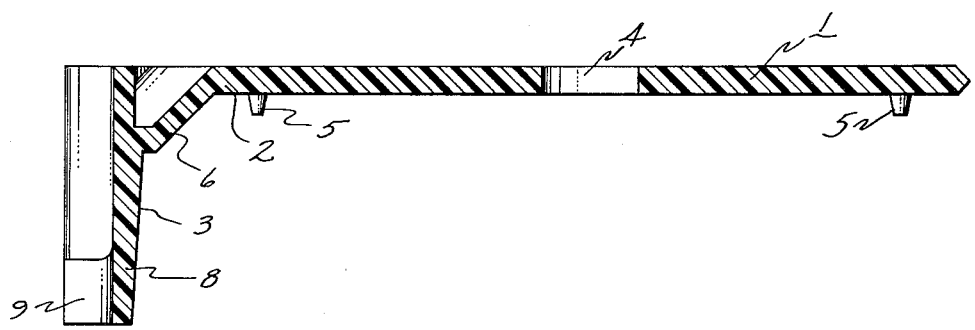
FIGURE 2 is a side view, in section, of the combined lens and lamp holder assembly.

Referring now more particularly to the drawings, FIGURES 1 and 2 illustrate an embodiment of the invention adapted for the illumination of lens plate 1. The lens plate 1 may be formed of glass or any of the plastics normally employed in edge lighted dials. In a normal illuminated dial application, this lens may serve one of two purposes, various lines or indicia may be engraved into the surface of the plate and become visible to an observer by light transmitted from the edge of the plate and passing through the plane of the plate to be reflected by such indicia; or else various engraved patterns may be formed in the surface of the plate to transmit light through an additional translucent or transparent indicia-bearing dial situated adjacent thereto.

In the arrangement shown, the lens plate is somewhat circular in shape with support 2 extending therefrom and connecting the lens plate 1 with a lamp holder 3. The lens plate is of uniform thickness in this embodiment and is shown with a center hole or opening 4 which may be utilized to allow various control or pointer means to protrude therethrough such as would be required in utilizing the lens in an electric clock. Also, mounting studs 5 are provided for positioning the lens within the supporting structure.

Figure 3:
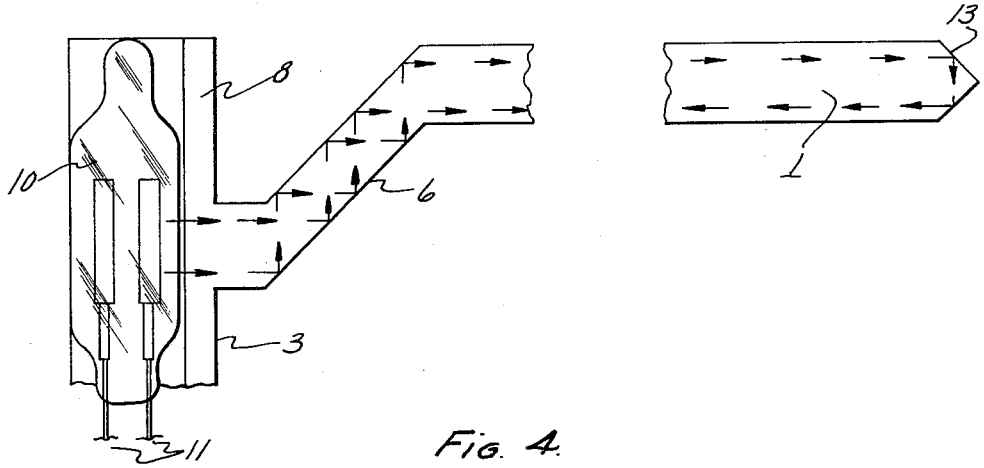
FIGURE 3 is an enlarged view, in section, of the lens and lamp holder assembly.
Figure 4:
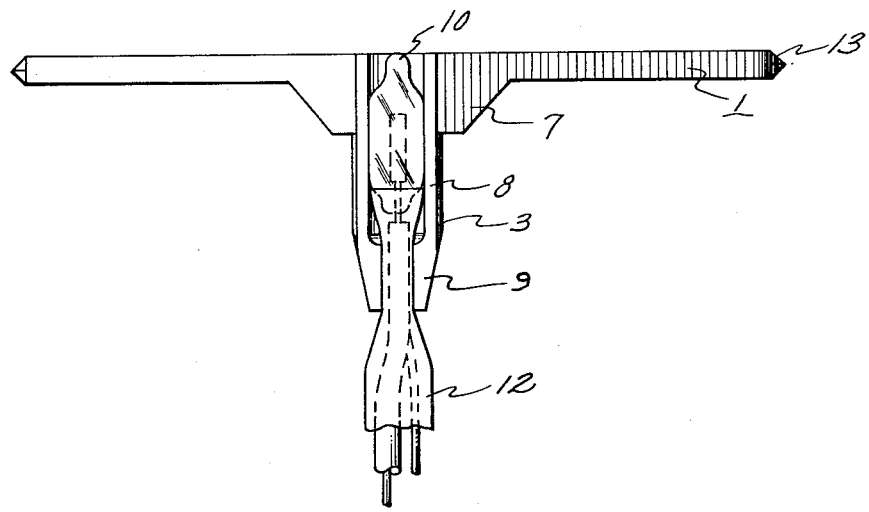
FIGURE 4 is an end view primarily showing the lamp holder assembly.

Referring now more particularly to FIGURES 1, 3 and 4, a support member 6 is illustrated projecting from the edge of the lens plate 1 to the lamp holder 3 and rigidly positioning the lamp holder structure with respect to the lens plate. Additional support is provided by the side members 7 located on each side of the support member 6, as most clearly shown by FIG. 1. It should be understood that the lamp holder 3, support member 6, and the lens plate 1 may be formed separately of light-transmitting material and fastened together in a suitable manner; however, the preferred embodiment is shown in the drawings whereby the combined lens and lamp holder structure is molded or otherwise formed in one integral light-transmitting plastic unit.

In the drawings, support member 6 is illustrated having a truncated conical-sector shape. Although the particular shape of this member is not critical, it has been found that better light distribution to and in the lens plate 1 is obtained from this particular configuration. Also, the curved cross-section of member 6 adds rigidity to the overall structure connecting the lamp holder and the lens plate. Its optical purpose is to efficiently conduct light from the plane of the glow discharge of an illuminating lamp to the plane of the lens plate 1. This light conduction may be made more efficient by polishing the surfaces of this member to improve the reflection therein.

The lamp holder 3 is situated so that the front edge of the holder is even with and does not protrude further than the front edge of the lens plate 1. This is done because, in most applications involving illuminated dials, it is desired that nothing protrude in front of or through the dial, however, it is obvious that holder 3 may protrude if desired. The lamp holder 3 is formed to hold a lamp therein, as the C-shaped holder 8, with a more restricted U-shaped portion 9 in one end thereof. The lamp holder assembly is formed of a light-conducting material similar to or the same as that from which the lens plate 1 is formed so that the light rays emanating from the lamp 10 may pass directly into the support member 6 for transmission through the lens plate 1. A similar application of this type of lamp holder may be made by locating the lamp holder approximately in the plane of the lens at a right angle to that illustrated in FIG. 3. In this arrangement the conical section connecting the lens plate and lamp holder would not be needed, however, additional space in the enclosure may be required.

The lamp 10 is of the usual type with two conductors 11 leading therefrom for connecting the lamp to a suitable electrical source for illuminating the lamp. An insulating sleeve 12 may be placed around the conductor members 11 to extend up to and over a portion of the lamp 10 to insulate and protect this lamp assembly. Also, this insulating sleeve 12 is squeezed into the restricted U-shaped portion 9 of the member 8 to hold it in place and serves an additional purpose of securing the lamp longitudinally in the lamp holder to prevent the lamp from moving within the C-shaped portion 8. A shield or similar light reflecting tape (not shown) may be placed around the lamp holder 3 and support member 6 to further prevent light from emanating away from the lamp holder assembly and also to direct the light to the support member 7 and into the lamp plate 1. Also this tape assists in holding the insulating sleeve 12 in place in the U-shaped portion of the holder.

As illustrated in FIG. 3, when the lamp 10 is inserted in the proper position within the lamp holder 3, and illuminated, light rays emanate therefrom and are conducted through the lamp holder 8 into the support member 6 where they are reflected between the polished surfaces (as indicated by the arrows) and thereafter conducted into the lens plate 1. As these light rays are subsequently conducted through the lens plate 1 as illustrated, they will encounter various indicia or indentations formed in the surface of the lens plate (not shown) and be reflected out of the lens plate where they will be visible to an observer. Also, the edges of the lens plate 1 are beveled to form reflectors 13 which serve to reflect that light which does not encounter the indicia in the lens plate surface, thereby allowing this reflected light to be returned and intercepted by the indicia and reflected out of the lens plate. In this manner, better utilization is made of the illumination provided by the lamp and any undesirable leakage light is prevented from emanating radially from the edge of the lens. Also, since improved utilization is made of the illumination, a smaller lamp or illuminating means is sufficient to illuminate the dial.

Although this embodiment illustrates the use of an ¹⁄₂₅th watt neon lamp 10, it should be apparent that other types of lamps are also useable in this invention. While we have chosen to illustrate an embodiment of the invention using only one lamp, several lamps may be applied to a lens plate in this manner. Also it is apparent that the lens plate 1 referred to in this discussion may also serve as the dial in a clock or other instrument by merely printing the required indicia on one of the surfaces.

From the foregoing description, it will be understood that we have provided an improved type of illuminated lens and lamp holder assembly which provides for better panel illumination while still being inexpensive in the cost of construction. Also, our illuminating device is much easier to assemble than previous structures requiring separate dial and lamp holder assemblies. While we have illustrated and described a particular embodiment of this invention, modifications thereof will occur to those skilled in the art. We desire it to be understood, therefore, that this invention is not to be limited to the particular embodiment disclosed and we intend in the appended claims to cover all modifications which do not depart from the spirit and scope of our invention.

What we claim as new and desire to secure by Letters Patent of the United States is:

1. An illuminated indicator device comprising a light transmitting plate member having front and rear face surfaces, a generally C-shaped lamp holder integrally formed with said plate member, the front face surface of said plate being arranged generally perpendicular to the axis of said C-shaped lamp holder and the front end surface of said lamp holder being flush with the front face surface of said plate member, an integral wall formed at the other end of said C-shaped lamp holder to provide a U-shaped constriction, a lamp positioned in said lamp holder in front of said U-shaped constriction, insulated conductors leading from the rear end of said lamp, said U-shaped constriction being smaller than said lamp and just of sufficient size to securely grip said insulated conductors, the source of light in said lamp being located between the front face surface of said plate member and the front portion of said constriction, and a light transmitting means for transmitting light rays from said source through said panel in a direction generally parallel to the face surfaces of said panel, said light transmitting means including a truncated conical member integrally connecting the central portion of said C-shaped lamp holder with said light transmitting plate member.

2. An illuminated indicator device comprising: a light transmitting plate member having front and rear face surfaces, a generally C-shaped lamp holder integrally formed with said plate member, the front face surface of said plate being arranged generally perpendicular to the axis of said C-shaped lamp holder and the C-shaped lamp holder being elongated in a direction generally perpendicular to the front face surface of said plate, a lamp positioned in said lamp holder, insulated conductors leading from the rear end of said lamp, said C-shaped elongated lamp holder having a generally curved outer wall, means defining an elongated opening extending through the outer wall of said C-shaped elongated lamp holder, the edge portions of said opening defining means being generally straight and being arranged generally perpendicular to the front face surface of said plate so that the lamp may be gripped through said elongated opening and accurately positioned within said lamp holder, said elongated C-shaped lamp holder being of just sufficient size to securely hold said lamp, and a light transmitting means integrally connecting said C-shaped lamp holder with said plate member, the source of light in said lamp being located adjacent to the central portion of said lamp holder behind the front face surface of said plate member and immediately adjacent to said light transmitting means integrally connecting said C-shaped lamp holder with said plate member so that light is transmitted through said plate in a direction generally parallel to the face surface of said plate.

3. An illuminated indicator device comprising: a light transmitting plate member having front and rear face surfaces, a generally C-shaped lamp holder integrally formed with said plate member, the front face surface of said plate being arranged generally perpendicular to the axis of said C-shaped lamp holder and the C-shaped lamp holder being elongated in a direction generally perpendicular to the front face surface of said plate, a lamp positioned in said lamp holder, said C-shaped elongated lamp holder having a generally curved outer wall, means defining an elongated opening extending through the outer wall of said C-shaped elongated lamp holder, the edge portions of said opening defining means being generally straight and being arranged generally perpendicular to the front face surface of said plate so that the lamp may be gripped through said elongated opening and accurately positioned within said lamp holder, insulated conductors leading from the rear end of said lamp, a plastic tube encircling said lamp and said insulated conductors, said elongated C-shaped lamp holder being of just sufficient size to securely grip said lamp through said plastic tube, and a light transmitting means integrally connecting said C-shaped lamp holder with said plate member, the source of light in said lamp being located adjacent to the central portion of said lamp holder behind the front face surface of said plate member and immediately adjacent to said light transmitting means integrally connecting said C-shaped lamp holder with said plate member so that light is transmitted through said plate in a direction generally parallel to the face surface of said plate.

References Cited in the file of this patent

UNITED STATES PATENTS

| | | |
|---|---|---|
| 2,259,910 | Rylsky | Oct. 21, 1941 |
| 2,640,144 | Levy | May 26, 1953 |
| 2,745,946 | Protzmann | May 15, 1956 |
| 2,786,196 | Haynes et al. | Mar. 19, 1957 |
| 2,907,869 | Hudson et al. | Oct. 6, 1959 |